No. 818,108. PATENTED APR. 17, 1906.
J. J. McCULLY.
MINE CAR WHEEL.
APPLICATION FILED JUNE 1, 1905.
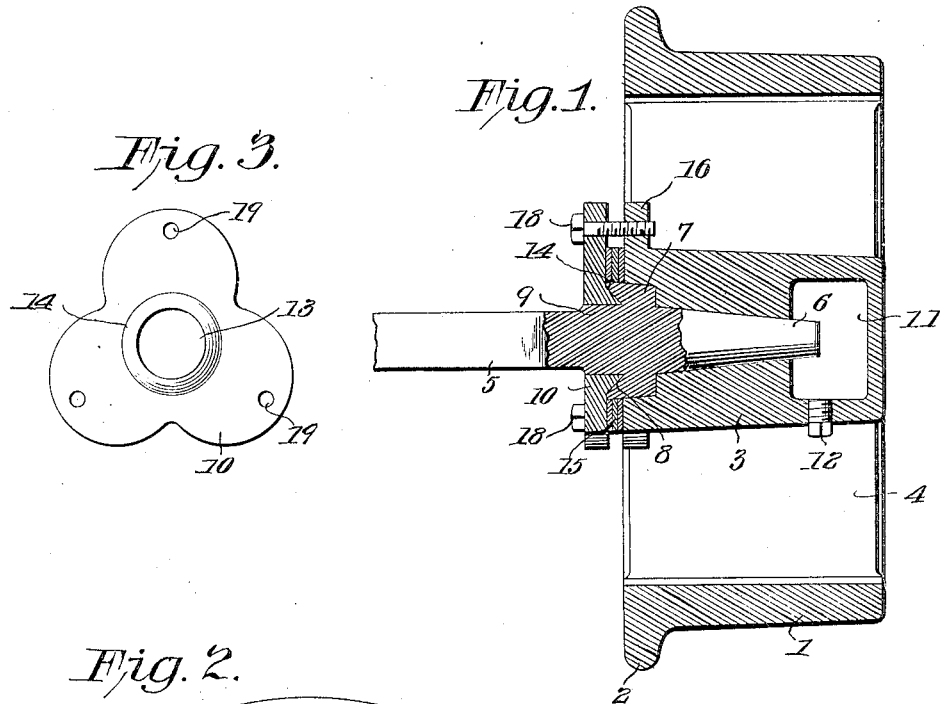
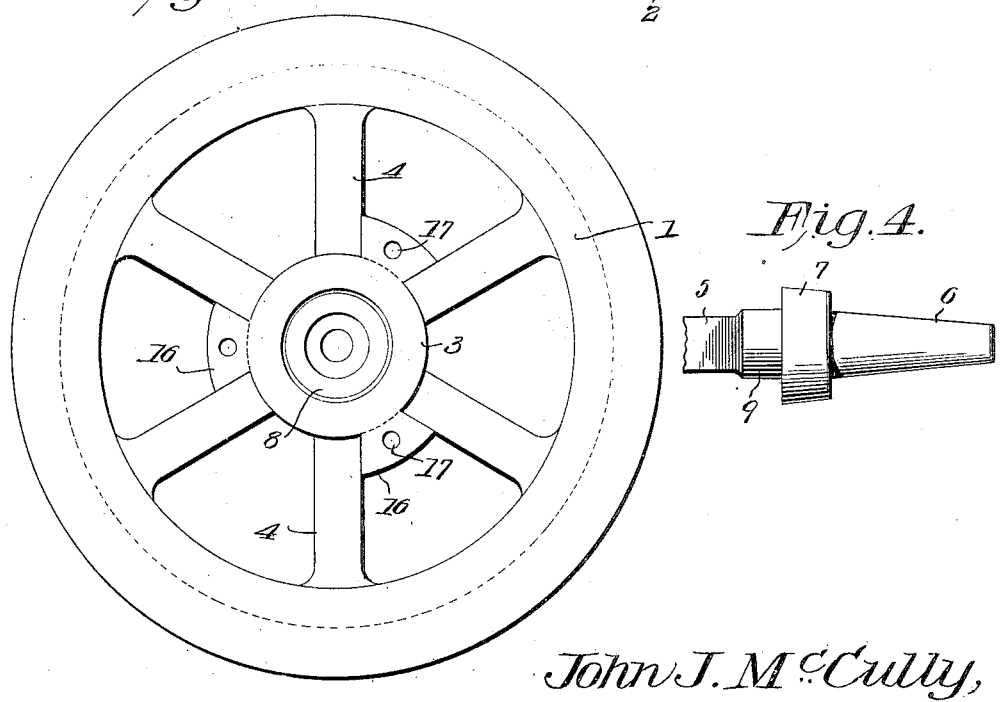
Witnesses:
John J. McCully,
Inventor,
by C. A. Snow & Co.
Attorneys.

UNITED STATES PATENT OFFICE.

JOHN J. McCULLY, OF MEXICO, MISSOURI.

MINE-CAR WHEEL.

No. 818,108.  Specification of Letters Patent.  Patented April 17, 1906.

Application filed June 1, 1905. Serial No. 263,351.

*To all whom it may concern:*

Be it known that I, JOHN J. McCULLY, a citizen of the United States, residing at Mexico, in the county of Audrain and State of Missouri, have invented a new and useful Mine-Car Wheel, of which the following is a specification.

This invention relates to mine-car wheels.

The object of the invention is to provide a mine-car wheel in which the axle shall be self-lubricating, in which compensation for wear of the axle and of the box may readily be secured, and in which intrusion of dust or dirt to the axle and box shall positively be prevented.

With the above and other objects in view, as will appear as the nature of the invention is better understood, the same consists in the novel construction and combination of parts of a mine-car wheel, as will be hereinafter fully described and claimed.

In the accompanying drawings, forming a part of this specification, and in which like characters of reference indicate corresponding parts, Figure 1 is a view in vertical longitudinal section through a car-wheel and axle constructed in accordance with the present invention. Fig. 2 is a view in rear elevation of the wheel, the axle being removed. Fig. 3 is a view in elevation of a dust-guard used in conjunction with the axle. Fig. 4 is a view in side elevation of a portion of the axle.

Referring to the drawings, 1 designates the wheel, which may be of the usual or any preferred construction and provided with a track-flange 2 and hub 3. As usual, the wheel, hub, and spokes 4 are cast integral, although, if preferred, they may be made as separate elements and held properly assembled.

The present invention resides in a novel form of axle-spindle and a novel form of dust-guard coacting therewith to preclude entrance of dust to the interior of the hub and the escape of oil therefrom, it being designed that the hub shall constitute a reservoir in which a quantity of oil shall be stored and be distributed sparingly, but with perfect effect.

The axle 5 is provided with the usual tapered spindle 6 and with a collar 7, having in its outer side an approximately V-shaped circumferential seat 8, the axle adjacent to the collar being rounded, as at 9, to form a bearing for the dust-guard 10, as clearly shown in Fig. 1. As the collar is of greater diameter than the spindle, the spindle-opening in the hub is counterbored for this purpose, and the smaller end of the spindle projects into a chamber or oil-reservoir 11, formed in the outer end of the hub, entrance to the reservoir being effected through an orifice normally closed by a plug 12, which may be screw-threaded, as shown, or held in position by frictional contact with the walls of the orifice.

The dust-guard 10, as shown in detail in Fig. 3, is preferably a trefoil-shaped element, although this is not essential, and is provided with a central orifice 13, surrounded by a flange 14, which is approximately V-shaped in section and engages closely with the seat 8, as shown in Fig. 1. The object of this arrangement is to secure a dust-tight juncture between the dust-guard and the collar without undue friction, and by the provision of the zigzag channel presented by the walls of the orifice 13 and the contacting faces of the seat 8 and flange 14 it will be seen that entrance of dust to the spindle will be practically obviated. However, as there will of necessity be some dust that would work its way through it is necessary that means be provided for precluding this positively. This is effected by the provision of a plurality of washers 15, that are interposed between the ears of the dust-guard and lugs or bosses 16, arranged between pairs of spokes 4 of the wheel and by preference cast integral with the hub, the lugs being provided with threaded orifices 17, that are engaged by bolts 18, passed through orifices 19 in the dust-guard. It will be seen that when the washers are in position and the nuts 18 tightened there will be a dust and oil proof joint between the parts; but it will not present such frictional resistance to the turning of the wheel as would be in the least objectionable.

In the use of the wheel the plug 12 is removed and the reservoir 11 filled with oil, after which the plug is reseated. The end of the spindle that projects within the reservoir operates as a take-up or distributer for conveying the oil throughout the length of the spindle, around the collar, and into the space between the contacting faces of the dust-guard, seat, and that portion of the spindle with which the dust-guard contacts, effecting thereby thorough lubrication.

In the event of wear of the flange or of the seat a washer may be removed and the dust-guard tightened, thereby taking up and compensating for all wear.

Having thus described the invention, what is claimed is—

The combination with a mine-car wheel, of a spindle having a collar provided on its outer face with an approximately V-shaped circumferential seat, a dust-guard having a flange corresponding to the shape of the seat and fitting therein, washers interposed between the dust-guard and the wheel-hub, and means for assembling the guard with the wheel.

In testimony that I claim the foregoing as my own I have hereto affixed my signature in the presence of two witnesses.

JOHN J. McCULLY.

Witnesses:
WILLIAM H. TURNER,
WILLIAM L. MATHENY.